US005690013A

United States Patent [19]
Kanarek et al.

[11] Patent Number: 5,690,013
[45] Date of Patent: Nov. 25, 1997

[54] AUTOMATIC SELF-ADJUSTING AND SELF-CENTERING BAGEL SLICING METHOD AND APPARATUS

[76] Inventors: David A. Kanarek, 509 Appletree La., Deerfield, Ill. 60015; Lawrence S. Kanarek, 910 Westbourne La., Buffalo Grove, Ill. 60089

[21] Appl. No.: 617,280

[22] Filed: Mar. 18, 1996

[51] Int. Cl.⁶ .................................................. B26D 3/08
[52] U.S. Cl. .................. 83/762; 99/391; 99/537; 83/932; 83/870; 83/874
[58] Field of Search ............. 83/762, 932, 870, 83/167, 165, 153, 437.1, 435.11, 431, 435.13, 435.25, 874, 871, 872, 873, 420, 421, 435.21; 198/468.8, 468.2; 99/391, 537

[56] References Cited

U.S. PATENT DOCUMENTS

| | | | |
|---|---|---|---|
| 1,217,717 | 2/1917 | Decker et al. | 83/437 |
| 2,095,620 | 10/1937 | Tuthill et al. | 83/751 |
| 2,235,546 | 3/1941 | Ahrndt | 83/872 |
| 2,552,135 | 5/1951 | Bertino | 99/391 |
| 2,948,312 | 8/1960 | Rothrock | 83/422 |
| 4,048,883 | 9/1977 | Lecrone | 83/422 |
| 4,589,315 | 5/1986 | Clement | 83/422 |
| 5,099,979 | 3/1992 | Kehrel | 83/420 |
| 5,167,177 | 12/1992 | Cimperman et al. | 83/932 |
| 5,404,782 | 4/1995 | Ryan et al. | 83/874 |

*Primary Examiner*—Maurina T. Rachuba
*Attorney, Agent, or Firm*—Gerald M. Newman

[57] ABSTRACT

An automatic bagel slicer includes a transport mechanism with spring loaded clamping panels for securely holding a bagel in a cutting attitude with respect to a horizontally disposed reciprocating cutting edge. A detent plate, that is mounted for limited vertical movement on the transport mechanism, has a contour that controls the opening and closing of the clamping panels in a coordinated manner as the transport mechanism is driven up and down. The sliced bagel is automatically released when the transport mechanism is at the lower part of its travel. The cutting edge is always concealed, thus precluding any danger to the user.

15 Claims, 6 Drawing Sheets

AUTOMATIC SELF-ADJUSTING AND SELF-CENTERING BAGEL SLICING METHOD AND APPARATUS

BACKGROUND OF THE INVENTION

This invention relates generally to a bagel slicing method and apparatus and particularly to a safe, reliable method and apparatus for slicing bagels and similar food products, that requires no operator skill.

Bagels are a very popular food product, both in the home and in restaurants of various kinds. Invariably, the bagel is sliced into two generally disk shaped portions before being toasted or having any of a variety of spreads applied. Slicing of a bagel, due to its non uniform density, the difficulty of holding it securely in position, the sharpness of the cutting knife, etc. has required care and skill by the user to avoid injury and to execute a smooth, symmetrical cut. It has been reported recently that injuries while slicing bagels account for a large portion of hospital emergency room visits.

The prior art offers a number of solutions to the problems associated with slicing bagels. The vast majority of the proposed solutions involve apparatus with an exposed cutting blade which requires skill and care on the user's part. The very simple devices merely provide a support for holding the bagel in a generally upright slicing attitude and a guide for directing a knife blade during the manual slicing operation. Other devices use a plunging action where the knife blade is forced through the bagel. In summary, all of the prior art devices impose some degree of risk to the user and demand varying levels of skill.

In general, all of the prior art devices expose the user to a sharp cutting edge such as a knife blade, usually require two hands for operation and necessitate a certain level of hand-eye coordination. The present invention overcomes these deficiencies of the prior art.

OBJECTS OF THE INVENTION

A principal object of the invention is to provide a novel method and apparatus for safely slicing a bagel or other food.

A further object of the invention is to provide an automatic bagel slicer.

Another object of the invention is to provide a novel bagel slicer that is simple to use and effective for its purpose.

It is also an object of the invention to provide a novel, automatic bagel slicer which may be used by physically handicapped or visually impaired individuals.

BRIEF DESCRIPTION OF THE DRAWINGS

These and other objects and advantages of the invention will be apparent from reading the following description thereof in conjunction with the drawings, in which.

DESCRIPTION OF THE PREFERRED EMBODIMENT

Figure 1:
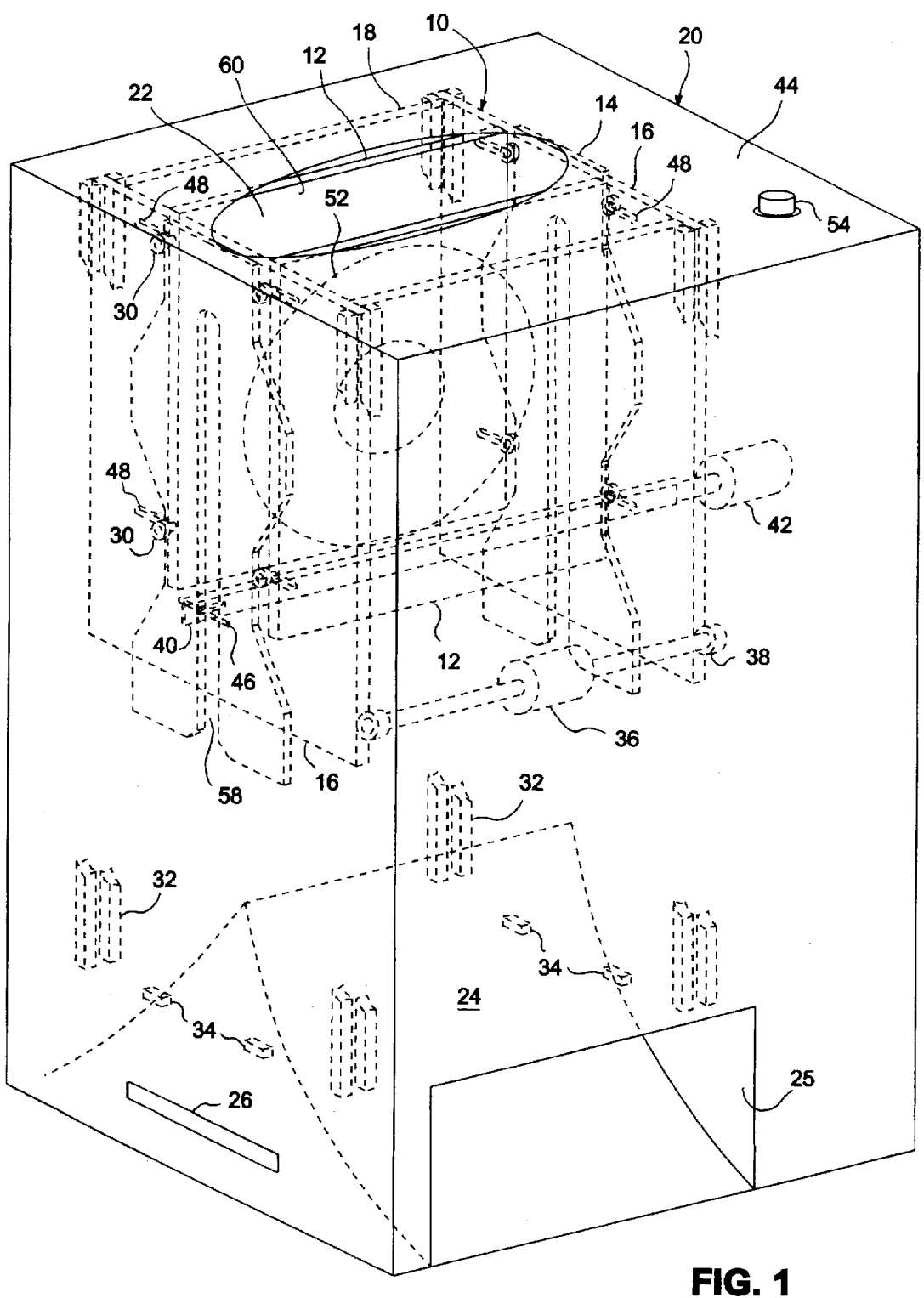
FIG. 1 is a perspective view of an automatic bagel slicer constructed in accordance with the invention.
Figure 2:
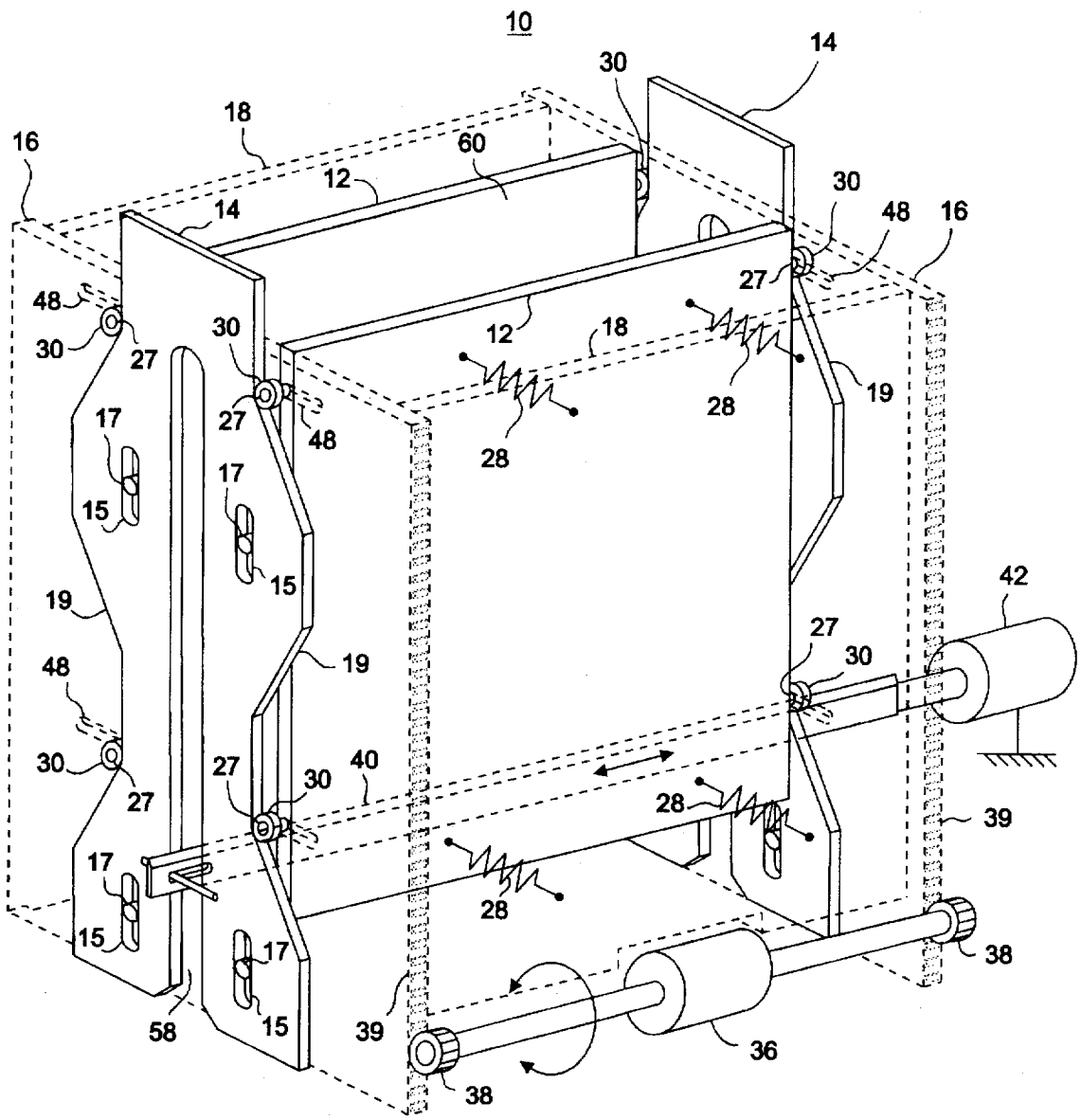
FIG. 2 is a partial view of the transport mechanism in the bagel slicer of FIG. 1.

Referring to FIG. 1, a transport mechanism 10, shown in dashed lines and more clearly illustrated in FIG. 2, consists of opposing left and right side panels 18 that are rigidly fastened to a pair of opposing, shorter front and rear end panels 16. The transport mechanism 10 is supported in a housing 20 that includes an opening 22 in a top surface 44 for reception of a bagel. The transport mechanism 10 is generally rectangular and includes a pair of opposed clamping panels 12 that are disposed below opening 22. The end panels 16 and the clamping panels 12 create a variably-sized bagel holding chamber 60 in transport mechanism 10. The clamping panels 12 secure a bagel or other similar food product by frictional engagement with the sides of the food product. To assist in this, the clamping panels 12 have textured or contoured surfaces which help to grip the bagel. The clamping panels 12 are biased toward each other, over a limited horizontal range, by a plurality of compression springs 28 that act between the inner walls of housing 20 and the outer surfaces of the clamping panels 12. A plurality of rollers 30 is rotatably mounted on a corresponding plurality of axles 27 that extend from the vertical edges of clamping panels 12. The axles 27 pass through respective horizontally disposed guide slots 48 that are formed in the end panels 16. The horizontal guide slots 48 limit the horizontal movement of the clamping panels 12 and preclude any significant vertical movement of the clamping panels. The disposition of the clamping panels 12 in either an opened or a closed position is determined by identical front and rear opposing detent plates 14. The detent plates are longer than the height of the end panels 16 and have outer contours 19 that the rollers 30 press against, thereby establishing the spacing between the clamping plates 12 and the size of the chamber 60. The minimum distance between the opposing contours 19 of each of the detent plates 14 determines the size of the smallest food product that may be securely supported in the chamber 60, whereas the maximum size of food product is limited by the size of opening 22.

The manner in which the clamping panels are supported in the transport mechanism provides for self-centering and self-aligning of the bagel to ensure that it is properly disposed with respect to the cutting edge 40 described below.

Figure 3:
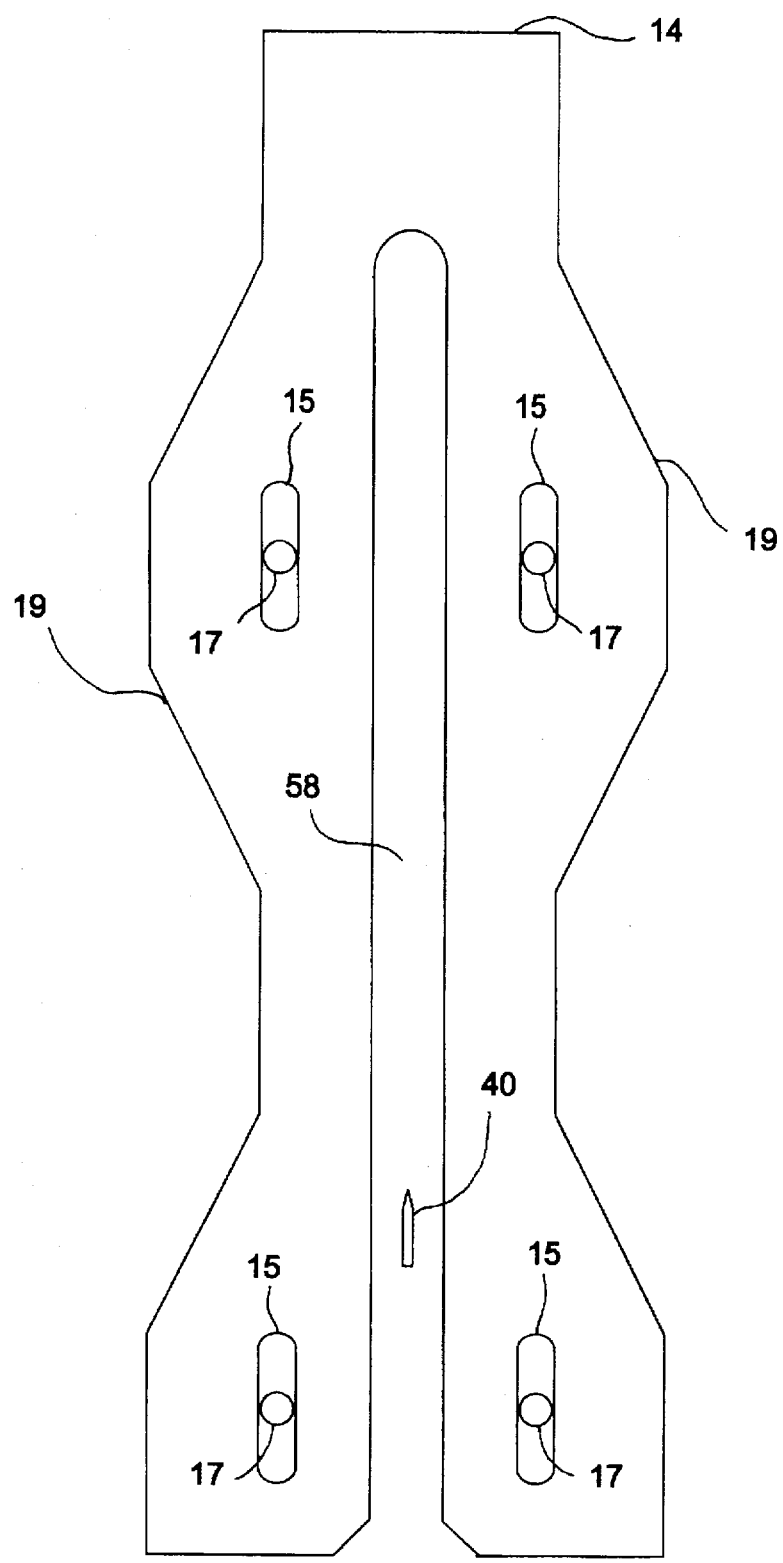
FIG. 3 is an enlarged partial view of a detent plate of the inventive apparatus.

As more clearly seen in FIG. 3, detent plate 14 includes four vertically disposed slots 15 that engage corresponding ones of four guide pins 17 that are secured to the end panels 16. The pins and slots limit the vertical movement of the detent plates with respect to the end panels. Each detent plate 14 includes a long vertical slot 58 that straddles a cutting edge or knife blade 40 that is horizontally secured in position in the housing 20.

The cutting edge 40 is arranged for reciprocation by means of a reciprocating motor means 42 of conventional construction, such as that employed in reciprocating blade knives. Any well known method of securement may be used with the indicated knife blade 40 including a slot 41 through which an axle 46 extends for supporting its distal end from end panel 16. It will be appreciated by those skilled in the art that only the rear one of the transport mechanism end panels 16 and detent plate 14 need be slotted to accommodate the movement of the transport mechanism with respect to the knife blade 40, the front end panel and detent plate in the illustrated embodiment being slotted for uniformity. It will also be appreciated by those skilled in the art that cutting edge 40 may comprise a movable wire, blade, laser beam, or other cutting device. The right edges of end panels 16 each include a rack gear 39 that is engaged by a suitable drive pinion 38 driven by a transport mechanism drive motor 36. The end panels 16 are slidably engaged in channel guides 32 that confine the transport mechanism to vertical motion. The channel guides 32 are affixed to the inner walls of housing 20.

The lower portion of housing 20 includes a generally wedge shaped discharge chute 24 that is positioned below the bottom of cutting edge 40 for guiding the sliced bagel for removal via openings 25 on either side of the housing. A drawer mechanism 26, for the periodic removal of crumbs, is provided. It will be appreciated that the housing 20 may comprise the upper portion of a larger toaster structure whereto a sliced bagel may be automatically conveyed for toasting and the wedge shaped discharge chute could be replaced with a thin separating plate or could be eliminated altogether.

Figure 4:
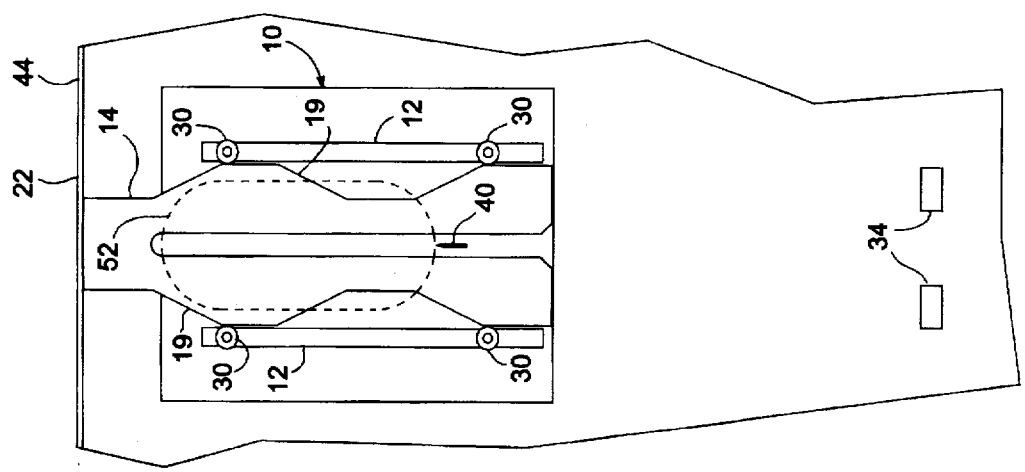

FIGS. 4–7 illustrate the operation of the detent plates 14 in positioning and securing a bagel in an attitude for slicing and subsequent release of the sliced bagel. FIG. 4 shows a bagel 52 that has been deposited in opening 22 in the top 44 of housing 20. The clamping panels 12 are maintained in an outwardly displaced position by the contour 19 of detent plate 14 acting upon rollers 30. The rollers 30 are continually forced against the contour of detent plate 14 by the action of compression springs 28 (not shown in these figures) on the clamping panels 12, to which the rollers are attached. The bagel 52 is seen to be in an unclamped, i.e., unsecured condition within the transport mechanism 10.

Figure 5:
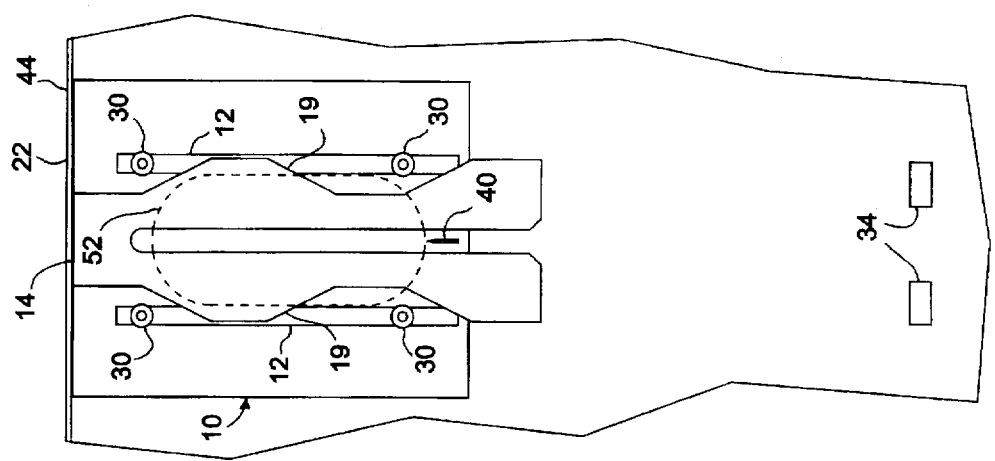
FIGS. 4–7 are partial views illustrating operation of the detent plate.

In FIG. 5, the transport mechanism has been moved upwardly (in response to closure of a start switch 54, as will be described) forcing detent plate 14 down so that its contour permits the clamping panels 12 to securely grasp the bagel 52 therebetween and hold it in a slicing attitude with respect to the cutting edge 40, which is positioned just below the bagel.

Figure 6:
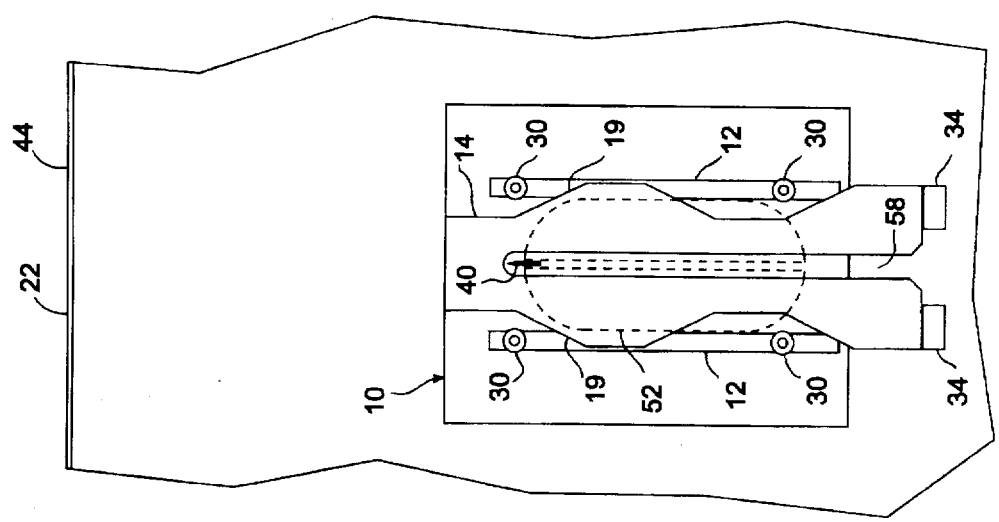

FIG. 6 shows the transport mechanism in its lowermost position, in contact with reset stops 34 that are affixed to the housing 20. In this position, the bagel 52, which was securely held between clamping panels 12, has been sliced into two generally disk shaped halves as the transport mechanism moved it past the reciprocating cutting edge 40.

Figure 7:
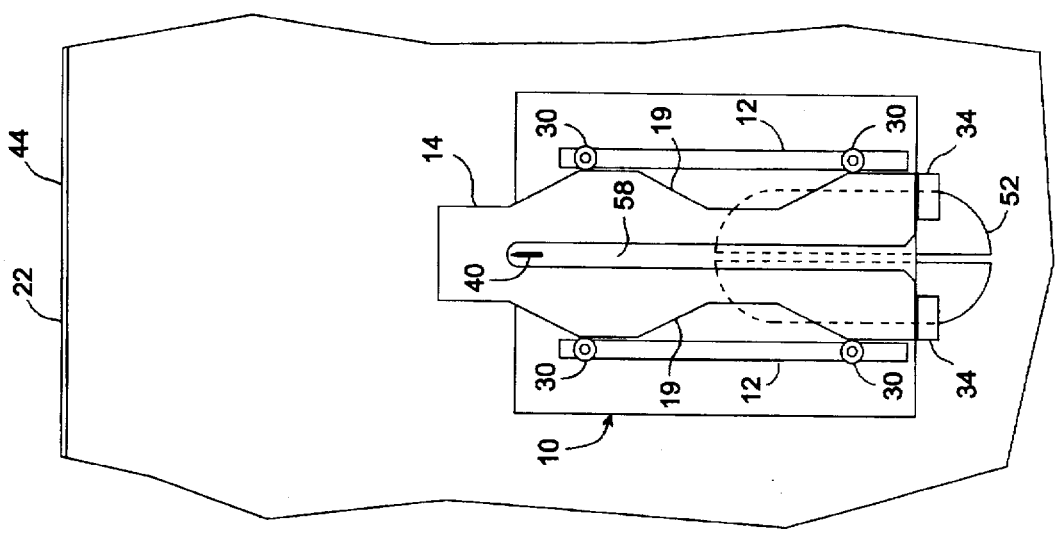

In FIG. 7, the sliced bagel is being released as the detent plate 14 is moved upwardly as a result of its contact with reset stops 34 to force the rollers 30 to move outwardly and "open up" the clamping panels 12. Thereafter the transport mechanism 10, without the bagel, is driven upward to its normal position just below the top of housing 20 with the clamping panels 12 separated in preparation for receipt of another bagel.

Figure 9:
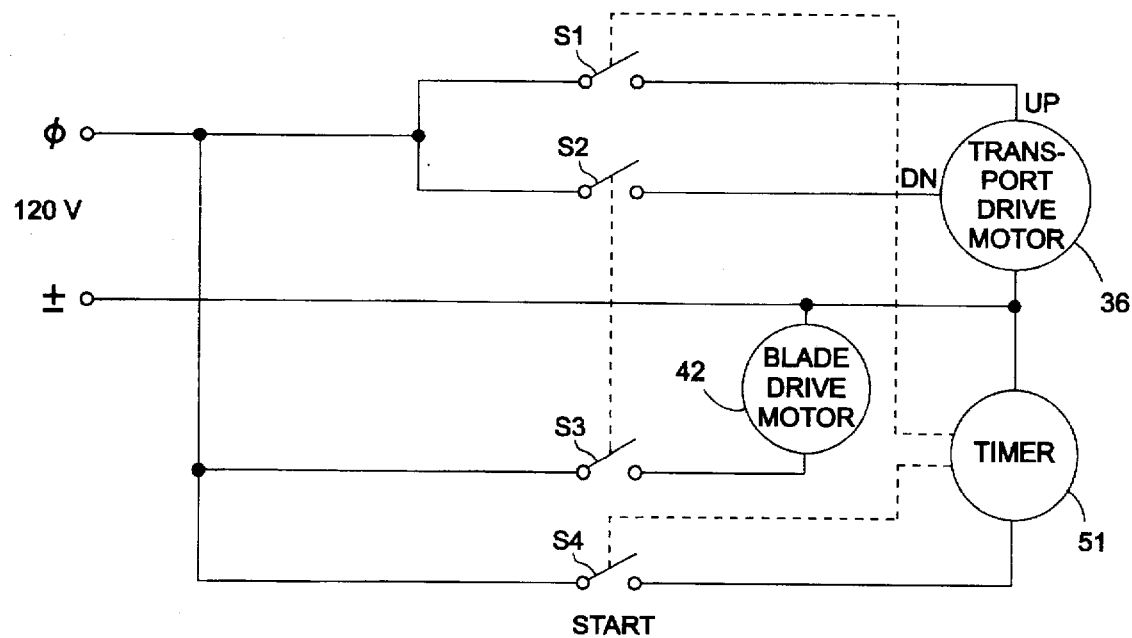

In operation, a bagel 52 is placed into the chamber 60 via opening 22 in the top 44 of housing 20. A start switch 54 is closed to complete a circuit to a timer 51 (FIG. 9). Timer 51, in turn, closes a switch 51 to complete a circuit to energize the transport drive motor 36 for rotation in a direction to drive the transport mechanism 10 upwardly. When the top of the detent plate 14 engages the underside of top 44 of the housing 20 (or any suitably positioned stop), the detent plate moves downwardly with respect to the end panels 16 of the transport mechanism 10, thus causing the clamping panels 12 to close in, under the urging of compression spring 28, and grasp the bagel securely. Timer 51 operates switches S1, S2 and S3 to reverse the rotation of transport drive motor 36 and to energize the blade drive motor 42 to commence reciprocation of the cutting edge. The transport mechanism 10, with the bagel 52 secured in a cutting attitude, is driven past the reciprocating cutting edge 40 and sliced. When the bottom of the detent plate 14 strikes the reset stops 34, the detent plate is driven upwardly in relation to the end panel 16 of the transport mechanism 10, causing the rollers 30 to drive the clamping panels 12 apart and release the sliced bagel, which drops onto the wedge shaped chute 24 where the sliced portions are removed via opening 22 or, as mentioned above, delivered to a toasting device. When the transport mechanism reaches the lowermost part of its travel, the timer 51 operates switches S1 and S2 such that the transport drive motor 36 is reversed, causing the transport mechanism to be driven upwardly. The clamping panels 12 remain open since the detent plate 14 is in its upward position with its contour 19 forcing the clamping panels apart against the bias of compression springs 28. The transport mechanism driven motor 42 is cut off by timer 51 when the transport mechanism reaches its starting point and the bagel slicer is ready for receipt of another bagel. It will be appreciated that the start signal need not be manually produced, but may be generated automatically when the bagel is inserted through opening 22.

Figure 8:
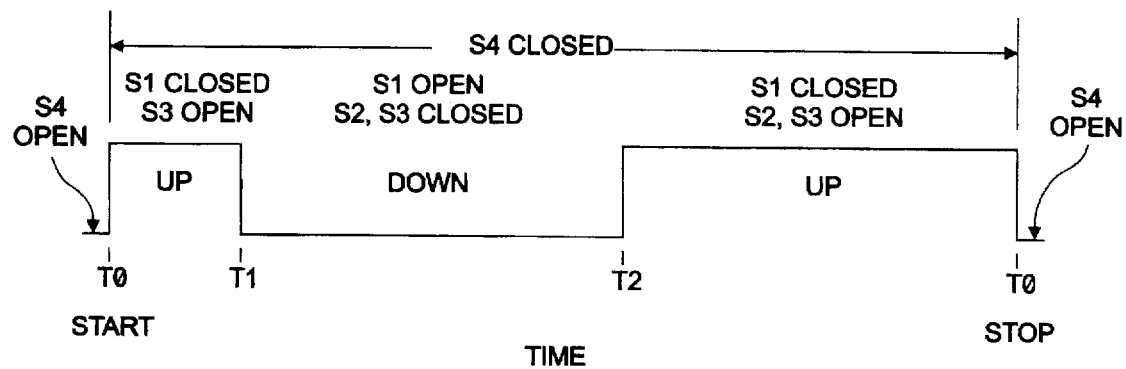
FIGS. 8 and 9 illustrate a timing diagram and switching arrangement, respectively, for the automatic bagel slicer of the invention.

FIGS. 8 and 9 illustrate a simple timing diagram and switching arrangement for controlling activation of timer 51 and switches S1–S4 for controlling the transport drive mechanism motor 36 and the cutting edge drive motor 42. At time T0, the start signal, initiated by closure of switch S4 either manually or automatically as discussed above, timer 51 is activated. Timer 51 effects closure of switch S1 and opening of switches S2 and S3. The transport drive motor 36 is operated to move the transport mechanism up for a time sufficient to cause detent plate 14 to be moved downwardly with respect to end panels 16 and cause the bagel 52 to be securely positioned in a cutting attitude with respect to the cutting edge 40. This occurs at time T1 and timer 51 opens S1 and closes S2 and S3. These actions reverse the direction of the transport drive motor 36, causing the transport mechanism 10 to proceed downward and activate the reciprocating mechanism (blade drive motor 42) for the cutting edge 40, which begins to reciprocate. The bagel 52 is sliced as it is moved over the reciprocating cutting edge 40 and is released when the detent plate strikes reset stops 34 corresponding to time T2. The timer now closes S1 and opens switches S2 and S3 causing the transport mechanism to be again driven upwardly with the clamping panels 12 in their open position (because detent plate 14 is in its up position) and ceasing the reciprocation of cutting edge 40. When the starting point is reached (at time T0 again), the timer 51 opens S1 and also opens the start switch S4 which shuts off the timer.

In the described and illustrated embodiment, the transport mechanism is moved relative to the fixed cutting edge. It should be appreciated by one skilled in the art that the transport mechanism could be fixed and the cutting edge moved relative to it or that both the transport mechanism and the cutting edge could be moved relative to each other. Also, the described and illustrated embodiment is shown in a vertical orientation. The structure could easily be rotated into a generally horizontal orientation which may be more suitable for certain applications without departing from the underlying invention.

What has been described is a novel method and apparatus for operating a bagel slicer that avoids the problems of the prior art in that the cutting edge is completely concealed at all times, and the eye-hand coordination of the user is no longer required for safe and consistent slicing. It is recognized that numerous changes in the described embodiment of the invention will occur to those skilled in the art without departing from its true spirit and scope. The invention is to be limited only as defined in the claims.

What is claimed is:

1. A method of slicing a bagel into disk shaped pieces comprising:

inserting the bagel into a transport mechanism in a housing;

providing a concealed cutting edge in the housing;

securing the bagel between a pair of biased open supports within the transport mechanism;

closing the supports to grasp the bagel in a slicing attitude adjacent to the concealed cutting edge;

moving the transport mechanism with respect to the cutting edge to slice the bagel and;

opening the pair of supports to release the sliced bagel.

2. The method of claim 1, further comprising reciprocating the concealed cutting edge.

3. The method of claim 1, further comprising resiliently biasing the pair of supports for movement towards each other whereby the supports are self-centering and self-adjusting so that the bagel is properly disposed relative to the cutting edge.

4. The method of claim 3 further including:

providing a detent plate engageable with the pair of supports for grasping the bagel between the pair of supports as the transport mechanism is moved for slicing and for releasing the sliced bagel from the pair of supports after slicing, the closing and opening of the pair of supports being controlled by movement of the detent plate.

5. The method of claim 4, further comprising:

providing a stationary motor means for reciprocating the cutting edge; and coordinating operation of the stationary motor means with movement of the transport mechanism.

6. The method of claim 5 wherein the housing includes an upper portion containing the transport mechanism and a lower portion, for removal of the bagel after slicing, with the cutting edge being located between the transport mechanism and the lower portion; and further comprising:

providing an opening in the lower portion for removal of the sliced bagel.

7. A method of slicing a bagel comprising:

providing a housing having a transport mechanism and a concealed cutting edge;

securing a bagel between a pair of biased open supports in the transport mechanism in a slicing attitude adjacent to the concealed cutting edge;

reciprocating the concealed cutting edge;

providing a detent plate on the transport mechanism for controlling closure of the supports; and moving the transport mechanism in response to the operation of a switch for carrying the bagel into slicing engagement with the cutting edge, the detent plate causing the biased open supports to close and grasp the bagel for slicing and to return to their open condition and release the bagel after slicing.

8. A bagel slicer comprising:

a housing having a top;

means for supporting a transport mechanism for movement in said housing;

a cutting edge positioned in said housing;

receiving means in said top for receiving a bagel in said housing;

biased securing means in said transport mechanism for grasping said bagel in a slicing attitude with respect to said cutting edge;

means for reciprocating said cutting edge;

means for moving one of said transport mechanism and said cutting edge with respect to the other of said transport mechanism and said cutting edge, and means for controlling said biased securing means to release said bagel after slicing.

9. The slicer of claim 8, wherein said receiving means comprises an opening in said top of said housing and further including:

a motor in said reciprocating means;

said biased securing means including resilient support members for securing said bagel in said slicing attitude; and switch means for coordinating operation of said motor with movements of said transport mechanism.

10. The slicer of claim 9, wherein said controlling means comprises:

a detent plate on said transport mechanism engaging said resilient support member for maintaining said bagel in said slicing attitude as said transport mechanism is moved relative to said cutting edge.

11. The slicer of claim 10, wherein said housing includes an upper portion containing said transport mechanism and a lower portion, for removing said bagel after slicing, said cutting edge being secured between said lower portion and said transport mechanism, and wherein said detent plate operates said resilient support member for releasing said bagel after slicing and further comprising:

a bagel discharge opening in said lower portion.

12. The slicer of claim 10, further including a guide positioned below said cutting edge for aiding in the removal of said sliced bagel.

13. The slicer of claim 10, wherein said resilient support member comprises a spring loaded panel engageable with said bagel.

14. An automatic bagel slicer comprising:

a housing;

a motor driven movable transport mechanism in said housing;

a detent plate on said movable transport mechanism;

means, including spring loaded panels, for securing a bagel in said transport mechanism in an attitude for slicing;

a motor driven reciprocable cutting blade mounted in said housing;

said detent plate controlling said spring loaded panels to grasp said bagel in said slicing attitude for movement of said bagel by said transport mechanism relative to said cutting blade, for cutting said bagel and for releasing said bagel after slicing.

15. The slicer of claim 14, further including:

a bagel guide in said housing under said cutting blade; and a bagel discharge opening in said housing adjacent said bagel guide.

* * * * *